United States Patent [19]

Mahin et al.

[11] Patent Number: 5,644,744

[45] Date of Patent: *Jul. 1, 1997

[54] SUPERSCALER INSTRUCTION PIPELINE HAVING BOUNDARY IDENTIFICATION LOGIC FOR VARIABLE LENGTH INSTRUCTIONS

[75] Inventors: Stephen William Mahin, Underhill; Stephen Michael Conor, Essex Junction; Stephen J. Ciavaglia, Williston, all of Vt.; Lyman Henry Moulton, III, Phoenix, Ariz.; Stephen Emery Rich, Essex Junction; Paul David Kartschoke, Williston, both of Vt.

[73] Assignee: International Business Machines Corporation, Armonk, N.Y.

[*] Notice: The term of this patent shall not extend beyond the expiration date of Pat. No. 5,625,787.

[21] Appl. No.: 440,035

[22] Filed: May 12, 1995

Related U.S. Application Data

[62] Division of Ser. No. 360,520, Dec. 21, 1994.

[51] Int. Cl.⁶ .................................... G06F 9/312
[52] U.S. Cl. ........................... 395/383; 395/380
[58] Field of Search ........................... 395/375, 775, 395/496, 800, 380, 383

[56] References Cited

U.S. PATENT DOCUMENTS

| | | |
|---|---|---|
| 4,669,043 | 5/1987 | Kaplinsky . |
| 4,985,825 | 1/1991 | Webb, Jr. et al. ............. 395/496 |
| 5,051,885 | 9/1991 | Yates, Jr. et al. . |
| 5,113,515 | 5/1992 | Fite et al. . |
| 5,144,692 | 9/1992 | Baker et al. ............. 395/425 |
| 5,210,842 | 5/1993 | Sood . |
| 5,226,130 | 7/1993 | Favor et al. ............. 395/375 |
| 5,285,527 | 2/1994 | Crick et al. . |
| 5,363,495 | 11/1994 | Fry et al. ............. 395/375 |
| 5,434,987 | 7/1995 | Abramson et al. ............. 395/375 |
| 5,450,605 | 9/1995 | Grochowski et al. ............. 395/800 |
| 5,471,591 | 11/1995 | Edmondson et al. ............. 395/375 |
| 5,500,942 | 3/1996 | Eickemeyer et al. ............. 395/375 |

Primary Examiner—Richard L. Ellis
Assistant Examiner—Gautam R. Patel
Attorney, Agent, or Firm—Whitham, Curtis, Whitham & McGinn; Susan M. Murray

[57] ABSTRACT

A mechanism which manages variable length instructions in cache is comprised of three cooperating elements designed to optimize self modifying code and anticipate next instructions for branch operand management. A content addressable memory (CAM) stores addresses of lines which have been accessed for instruction fetching. In a system having modifiable instruction stream (i.e., store to instruction stream), when the CAM matches, the system must retire certain instructions, flush instructions and then fetch the modified instruction stream. Boundary identification logic examines a field in each cache byte to determine the nature of the byte. This field is initially cleared at the time the cache line is loaded and filled with the line is fetched. An anticipation buffer designed to minimize the circuitry necessary for fetches across cache lines is loaded with sequentially anticipated prefetched instructions from the cache. These anticipated instructions can then be concatenated by a fetch aligner.

18 Claims, 4 Drawing Sheets

SUPERSCALER INSTRUCTION PIPELINE HAVING BOUNDARY IDENTIFICATION LOGIC FOR VARIABLE LENGTH INSTRUCTIONS

CROSS REFERENCE TO RELATED APPLICATION

This application is a divisional of application Ser. No. 08/360,520 filed Dec. 21, 1994.

BACKGROUND OF THE INVENTION

1. Field of the Invention

The present invention generally relates to fetching instructions from an instruction cache (I-Cache) and, more particularly, to an effective mechanism for simultaneously fetching multiple instructions in a pipelined microprocessor with minimum complexity for high speed out-of-order instruction execution in microprocessor architectures, including those that permit store to the instruction stream (i.e., self-modifying code).

2. Description of the Prior Art

In certain microprocessor architectures, variable length instructions are permitted. The Pentium® microprocessor (sometimes referred to as X86 architecture) by Intel, for instance, supports instructions from one to fifteen bytes in length. In order to achieve high performance, it is desirable to prefetch and dispatch multiple instructions in one cycle. To be able to fetch multiple instructions at a time in such an architecture, the hardware required can be extensive since instructions can start on any byte boundary and knowledge of the length of each preceding instruction is needed to detect the boundary.

In order to support an architecture that allows self modifying code, that is, the ability to store to the instruction stream in such a way that out of sequence execution will execute the modified instruction stream as if the Store-to-the-Instruction-stream event had occurred in sequential "Program Order", a microprocessor must detect the occurrence of an Instruction Fetch where a preceding recent store has potentially modified the instruction stream. Due to the presence of separate Instruction cache (I-Cache) and Data cache (D-Cache), out of sequence execution and pipelining, the occurrence can be very difficult to handle. The offending store operation may occur after "later" instructions have been speculatively dispatched down the pipeline. The performance hit must be minimized.

In a high performance microprocessor, it is desirable to utilize caches; further, it is desirable to fetch wide bandwidth fields, i.e., lines from the cache, in order to achieve the desired performance. Instructions can be variable length and can straddle the field boundary in many architectures. In order to achieve performance of a superscaler design where instructions are executed out of order and more than one execution element exists and in order to minimize the amount of logic and complexity, it is desired to buffer the current line, the next sequential line and the branch target line simultaneously.

An example is the Branch instruction. For the Branch instruction, the instruction itself may straddle the field boundary. In one reduced instruction set computer (RISC) microprocessor example, a 32-byte line (field) is fetched from the I-Cache at a time. A Branch instruction may begin with the first byte of the instruction in field 1, the rest of the instruction in field 2 and the branch target instruction in field 3. The problem is minimizing the performance impact of accessing the three fields sequentially.

Prior art (Intel's Pentium® microprocessor, for instance) implements a method where the cache could be fetched on a line boundary or a half line boundary. This means that if the instruction fetched begins in the higher order 16 bytes, the 32 bytes of that line are returned to the processor. If, however, the first byte of the instruction fetched is in the lower 16 bytes, those 16 bytes will be concatenated to the high order 16 bytes of the next sequential line. Thus, an instruction that resides in the cache can always be fetched in one cycle. This is complex to implement and takes many circuits.

SUMMARY OF THE INVENTION

It is therefore an object of the present invention to provide an improved mechanism that supplies instruction location information which facilitates simultaneous instruction decode and more than one variable length instruction at a time.

It is another object of the invention to provide an effective mechanism of minimized complexity to permit high speed out-of-order instruction execution in microprocessor architectures that permit store-to-the-instruction-stream operations.

It is a further object of the invention to provide a mechanism that facilitates instruction decode of more than one instruction at a time even when a speculative branch is taken.

According to the invention, there is provided a mechanism to identify instruction boundaries by the use of tag bits in the instruction cache. These tag bits significantly speed up instruction decode and subsequent execution of software. This is particularly important for instructions that are variable length. In particular, the invention improves the performance in software loops for variable length instructions. The mechanism is comprised of three cooperating elements which are designed to optimize instruction boundary management, track cache management to support and optimize self modifying code, and anticipate next instructions for branch operand management. The three elements are a content addressable memory (CAM) for storing an instruction address for each of a plurality of instructions, boundary identification logic for identifying instruction boundaries for each of the plurality of instructions held in cache, and an anticipation buffer holding a next instruction or the target instruction of a speculative branch.

In operation, the CAM stores most recent addresses of cache lines which have been accessed for instruction fetching. In a microprocessor system having, a modifiable instruction stream (i.e., store-to-instruction-stream), store operand addresses are compared with the address in the CAM and, if a match is found, that is an indication of a possible "Store-to-Instruction-stream" event. When the CAM matches, the system must retire certain instructions, flush instructions, and then fetch the modified instruction stream. Thus, upon detection of a possible store to the instruction stream by a CAM hit, all instructions prior to the store instruction are completed and all of the subsequent instructions are terminated and the updated line is fetched from memory to the cache. In a store-in cache, the boundary field bits are reset to "0".

The boundary identification logic evaluates a boundary field in each cache byte which provides an indication of the nature of the byte. This field is initially cleared at the time the cache line is loaded and written when instructions are fetched from the cache.

The anticipation buffer is designed to minimize the circuitry necessary for fetches across cache lines. The anticipation buffer is loaded with sequentially anticipated prefetched instructions from cache and branch target instructions. These anticipated instructions can then be concatenated by a fetch aligner.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
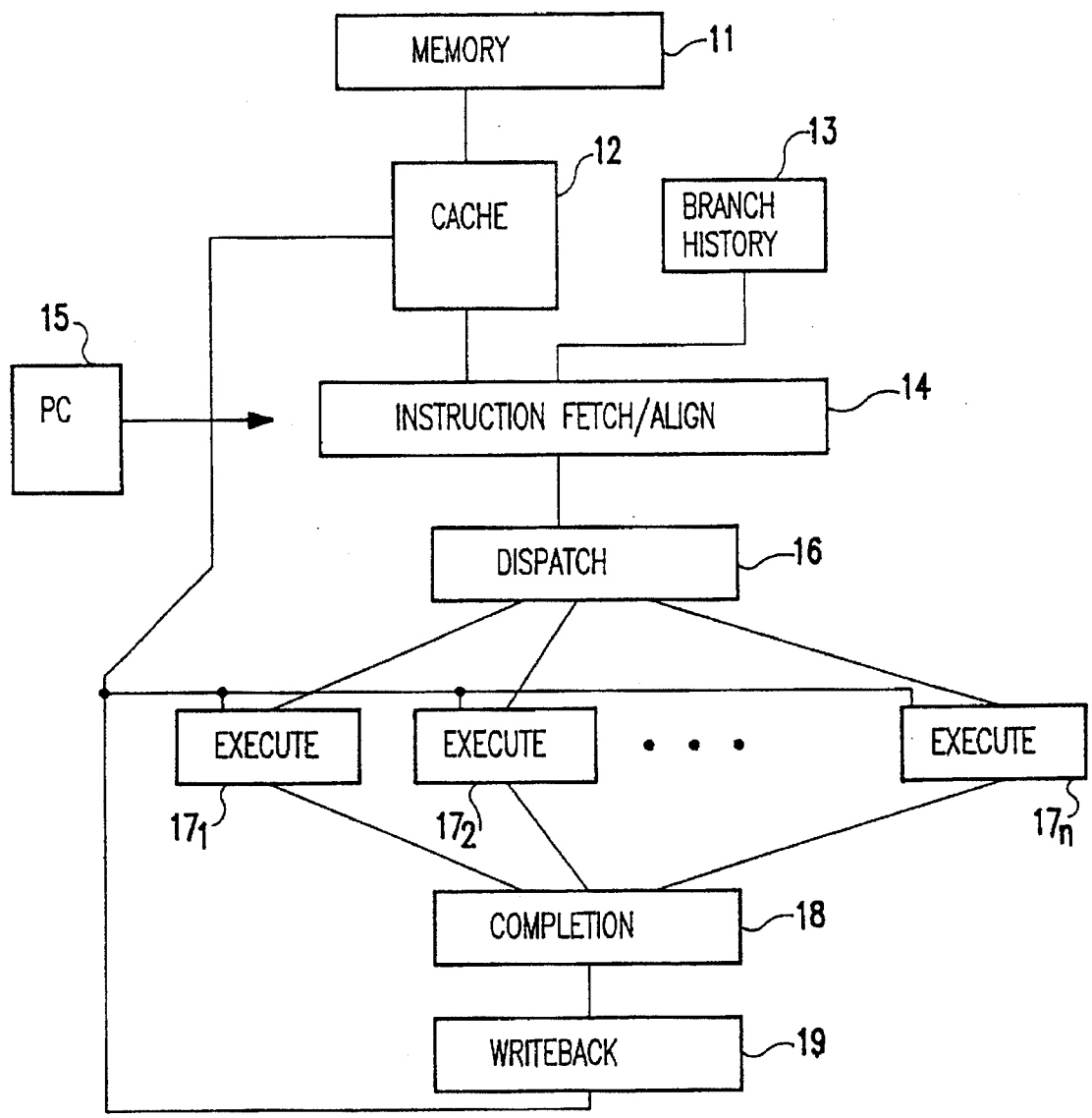
FIG. 1 is a block diagram illustrating a superscaler instruction flow for high speed out-of-order instruction execution.

Referring now to the drawings, and more particularly to FIG. 1, there is shown an improved microprocessor instruction handling design according to the invention to support simultaneous fetching and dispatch of instructions in a single cycle. Instructions and data are fetched from memory 11 and stored in cache 12. The cache 12 is included, as is known in the art, to improve system performance when accessing memory 11. The cache 12 may be a single unit or multiple units are such as an instruction cache (I-Cache) unit and a data cache (D-Cache) unit. The cache supplies a multiplicity of bytes (called a line) in a single cycle. In the example implementation, the line is 32 bytes wide.

Also included is a branch history table (BHT) 13, also known in the art, the purpose of which is to supply speculative branch target instructions to improve performance. The branch history table allows the instruction execution to proceed speculatively with a high degree of likelihood that the branch guess is good, reducing the latency of waiting for the branch instruction to be executed. An instruction fetch unit 14 in conjunction with the program counter (PC) 15 prefetches instructions from the cache 12 speculatively in order to reduce latency of instruction access. The instruction fetch unit 14 operates in conjunction with the BHT 13 such that if a branch is encountered, its target is supplied by a branch target anticipation cache (BTAC), not shown in the drawing but which may be part of the instruction fetch unit 14. Anticipation buffers in the instruction fetch unit 14 hold the current instruction cache line as well as the next cache line. Speculative streams of instructions are prefetched and aligned in this hardware such that a branch instruction that straddles two lines will be resident in two lines of anticipation buffers while the BTAC line that contains the speculative target is available as well. The anticipation buffers work in conjunction with the PC 15 such that the appropriate lines are concatenated and shifted appropriately. This process is well known in the art and, therefore, will not be discussed in more detail.

The instructions in cache 12 are decoded and dispatched by a dispatch unit 16 to multiple execution elements $17_1$ to $17_n$ in a single cycle. The instructions are dispatched to the multiple execution elements $17_1$ to $17_n$ where they are executed without being limited to program order. The results of the execution units temporarily stored in completion buffer 18 and, under the control of the writeback unit 19, are written to cache 12 for later storage in memory 11.

In order to reduce latency in fetching multiple instructions in a cycle where instructions can be of variable length, the instruction boundaries are marked in the cache 12 such that when the line is fetched, the alignment logic of the instruction fetch unit 14 knows where the instruction operands are without first sequentially decoding the instructions. The mechanism will fetch the instructions sequentially on the first pass through the line and will mark the boundary with special tag bits in the cache 12. Thus, on successive passes through the instruction stream, the boundaries are known and multiple instructions can be decoded and dispatched simultaneously.

Figure 2:
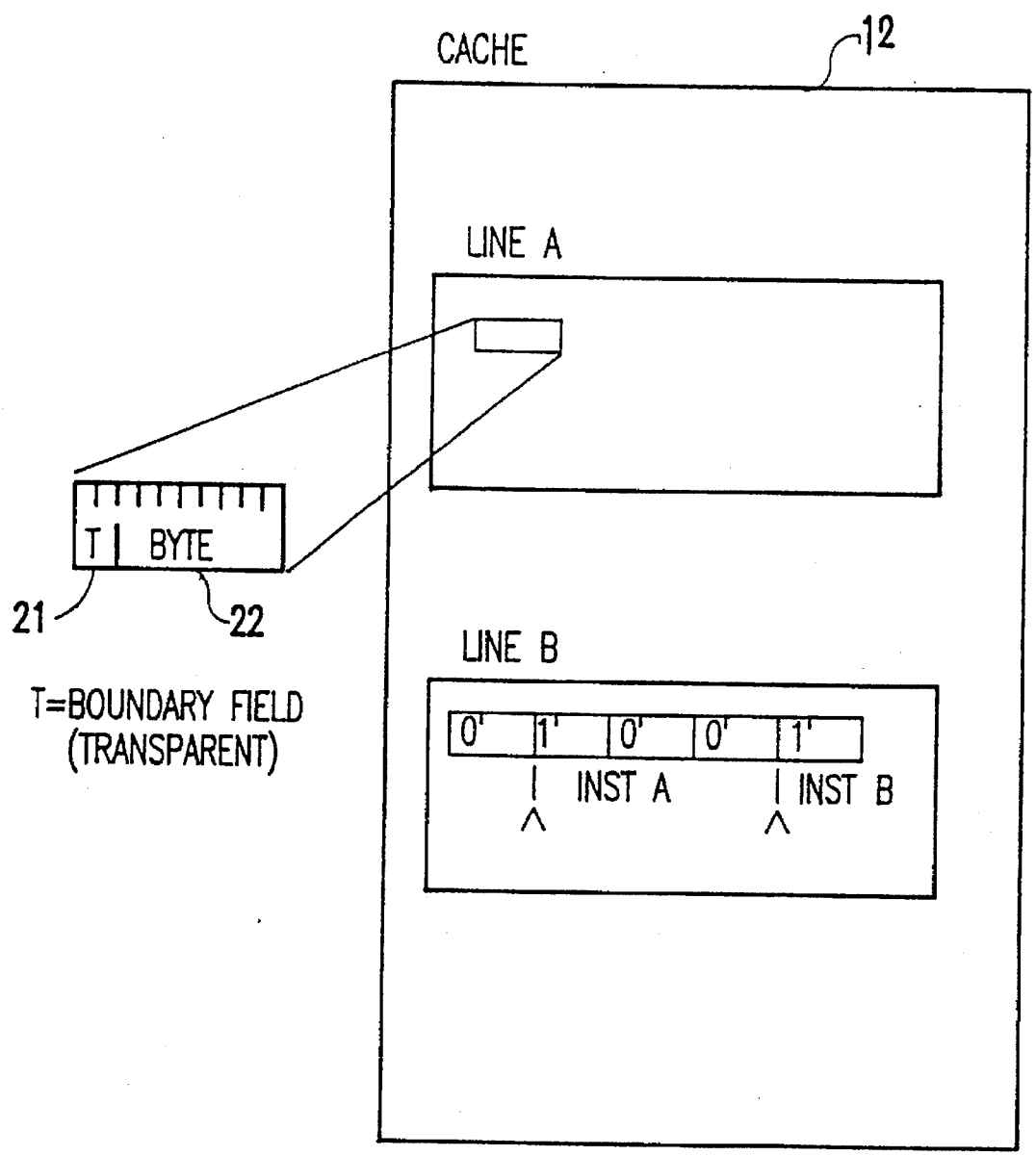
FIG. 2 is a block diagram illustrating an instruction boundary mark using a "T" field according to the invention.

FIG. 2 illustrates the marking mechanism where the "T" field 21 is not visible to the programmer, each byte 22 in the cache 12 having an associated "T" field. This field 21 not only marks the beginning of a variable length instruction as shown, but also contains critical information about the instruction to reduce decode time.

Figure 3:
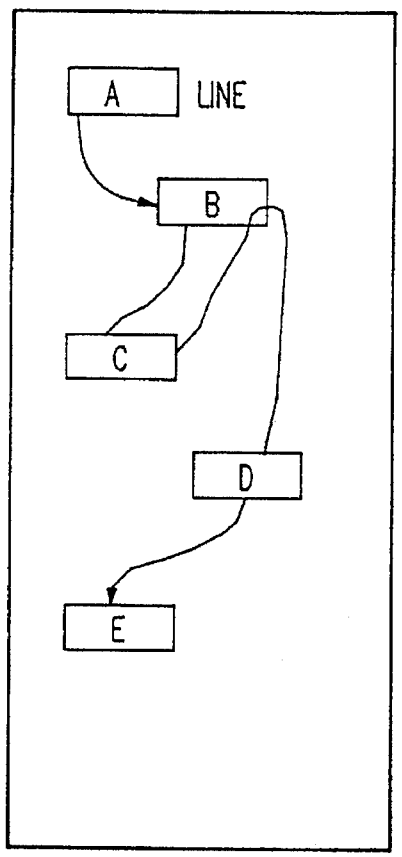
FIG. 3 is a hypothetical flow diagram showing a store to the instruction stream.

FIG. 3 shows an example of a store to memory operation in the instruction stream as in the case of self modifying code. The instruction line sequence is from instructions A to B to C, in sequence. However, in the example depicted, the result of instruction C is a store to memory operation which modifies instruction B, and the sequence then proceeds from instruction B to instructions D and E in that sequence.

Figure 4:
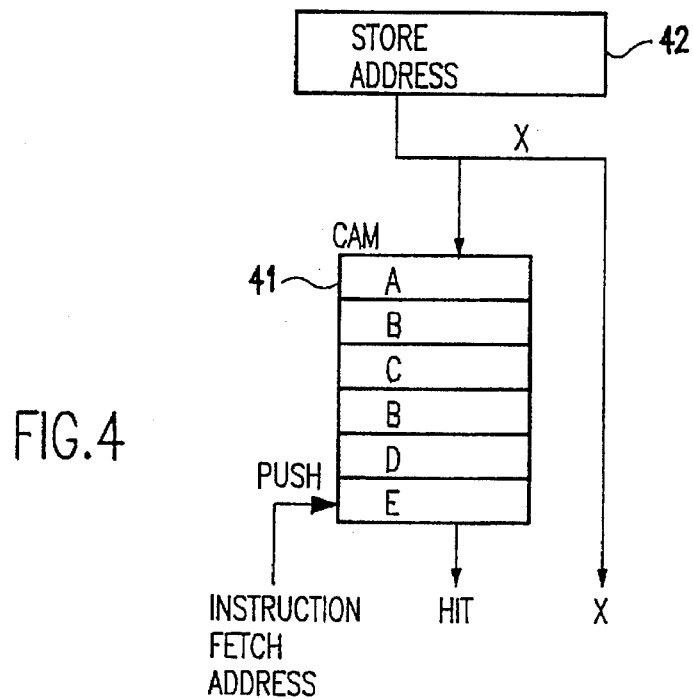
FIG. 4 is a block diagram showing the content addressable memory used to detect a store to the instruction stream.

In order to provide the possibility that a store to memory operation is directed to the instruction stream (self modifying code), as generally indicated by the instruction line sequence depicted in FIG. 3, hardware is included, shown in FIG. 4, that detects the rare condition that this has occurred. FIG. 4 shows an instruction boundary content addressable memory (CAM) 41 which is written with the instruction address each time a cache line boundary is crossed due to an instruction fetch, such that it contains the most recent cache line addresses associated with the most recent instructions fetched. The CAM 41 receives the address of a store line from register 42 as a search argument and generates a match indicator if the search finds a match in the CAM 41. The match indicator is provided to the completion buffer 18 (FIG. 1) to prevent subsequent instructions in the pipeline from completing so that they can be purged and refetched subsequent to the store operation.

The CAM 41 has entries written each time an instruction is fetched from a new line in the cache 12 (FIGS. 1 and 2). The CAM 41 contains the history of all instruction line addresses that are associated with instructions that may be in the pipeline. When a store to memory operation is performed, the CAM 41 is interrogated and, if there is a match of the store address with one of the instruction addresses in the CAM, a CAM hit is generated. The CAM hit condition indicates that the store may be to the instruction stream in the pipe (or in the I-Cache if separate). The CAM hit condition causes the pipe to be flushed such that all instructions following the store operation in program order are purged. The I-Cache line associated with the store address is invalidated and its tag fields are set to "0". Instruction fetching is then re-initiated.

The address of each instruction that is to be executed is compared against a table of addresses implemented in the CAM 41 such that the entire table can be searched in one operation cycle. There are thirty-two entries in this implementation, each entry contains the address of a cache line (32 bytes of data) that has been accessed to fetch an instruction (I-Fetch). Each I-Fetch operation, saves the address of the line(s) fetched in the CAM 41. This address is saved in the same location in the CAM 41 until an instruction fetch occurs that uses a different line. When the line fetched is different, the next location in the CAM 41 is written with that address. As an example, if thirty-two jumps occur in sequence to different lines, the CAM 41 will fill up with thirty-two different entries. If jumps occur alternately to only two lines, the CAM 41 will fill up with sixteen copies of one line and sixteen of the other. The CAM 41 entries are first-in, first-out (FIFO). In the specific example of this implementation, thirty-two entries is sufficient since the pipe can only have less than twenty-five operations pending at a time.

This mechanism allows the execution to proceed with the performance of ignoring the store-to-the-instruction-stream event. If such an event occurs, it is detected by an address match in the CAM 41. This Match event will record an exception condition in the completion buffer 18 (FIG. 1). The completion buffer 18 is responsible for maintaining the architectural state of the machine. It does this by retiring instructions in order, so that all updates to the machine state are done in program order. The completion buffer 18 has twelve entries, so that up to twelve instructions can be in various states of execution at any one time. The buffer is also used to support precise interrupts and allow recovery from speculative instruction execution.

When the Store-to-Instruction-stream event has been recorded, an exception signal is input to the completion buffer 18 due to a CAM match. In response to this exception signal, the completion buffer 18 will retire the instructions prior to the offending store operation (in program order). When the Store operation is retired, the exception condition in the completion buffer 18 will signal the machine to "flush" the instructions that follow the Store in program order from the pipe (dispatch buffer 16, rename CAM 41, completion buffer 18 and I-Cache 12). Subsequently, the modified instruction stream will be fetched from the cache 12 or memory 11.

Figure 5:
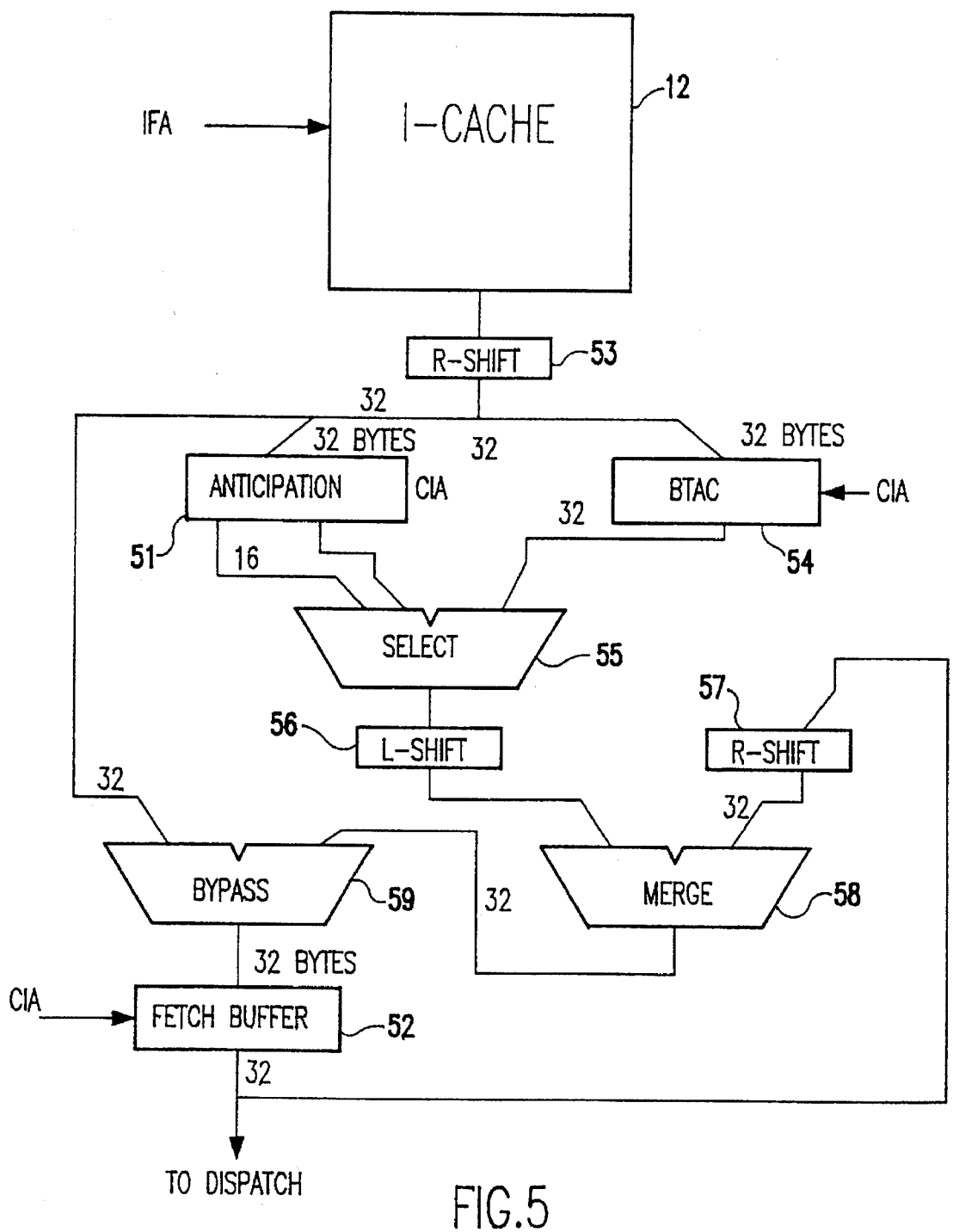
FIG. 5 is a block diagram showing a fetch aligner which includes an anticipation buffer according to the invention.

The alignment and decoder function is implemented in the structure shown in FIG. 5, to which reference is now made. The idea is to interpret instruction boundaries and flag the bytes in the cache line to indicate where instructions start. These flags are written into an adjunct area of the cache 12 so that they are available when a line (32 bytes) of instructions are fetched.

The fetch aligner shown in FIG. 5 contains an "anticipation buffer" 51, the contents of which are prefetched from the cache 12 which is addressed by the instruction Fetch Address (IFA), such that the processor has access to not only field 1 with the current instructions, but also the next field (field 2) which is the next sequential set of instructions. Instructions from the anticipation buffer 51 are concatenated to the right of those in the fetch buffer 52 by the fetch aligner right shifter 53 in response to the Current Instruction Address (CIA). When the anticipation buffer 51 is "emptied", a pre-fetch operation will load it with thirty-two more bytes of sequentially anticipated instructions. The anticipation buffer 51 minimizes the effect of Next Sequential Instruction boundary crossing.

Field 3 is obtained from the Branch Target Cache (BTAC) 54 which contains a history table of Branch Target instructions. Field 3 participates in the fetch alignment similarly to the anticipation buffer In the case of the BTAC 54, the fetch aligner will sequentially load the target instruction (and any additional bytes of the thirty-two byte BTAC) into the fetch buffer 52 sequentially concatenated to the right of the current Branch instruction. The anticipation buffer 51 and the BTAC 54 are connected to a select multiplexer 55 which supplies a selected field to a left shifter 56. The fetch buffer 52 is connected to right shifter 57, and the outputs of left and right shifters 56 and 57 are supplied to a merge multiplexer 58.

The "merge" function of multiplexer 58 in conjunction with the left and right shifters 56 and 57 concatenates the pre-fetched branch target instruction stream and the preceding instructions in the fetch buffer 52. The fetch buffer 52 is loaded by the bypass multiplexer 59 which receives its inputs from cache 12 and the merge multiplexer 58. Instructions can be shifted up to twenty-one bytes at a time corresponding to the maximum of three 7-byte simple instructions which can be fetched simultaneously in the preferred implementation.

When a cache line is active, the fields for multiple instructions can be decoded simultaneously to improve performance. For architectures that support "Self Modifying Code" where Store operations can be executed to the code area of Storage, whenever a cache line is written, the flags are erased. If a branch occurs to the middle of a line, only the flags for the higher order instruction will be set. The preceding instructions in the target line cannot be set until an Instruction fetch is made that utilizes that part of the line. The technique takes advantage of the nature of programming that utilizes re-occurring code such as DO WHILE loops, and the like, for the initial pass through the loop. For code that does not re-occur frequently enough to stay in the cache, the mechanism provides no performance advantage.

This invention also enhances the instruction boundary pointer in the cache by encoding important information in the pointer. Since the instruction have previously been decoded in order to determine the instruction length, the important (machine dependent) function could have been extracted in the previous decode and stored in the boundary pointer. At the same time, this invention reduces the amount of logic and complexity needed by traditional approaches.

In certain architectures (X86 for instance), instructions can be variable length and the operation code may be preceded by prefix bytes. Also, "simple instructions" (those that execute in one cycle) are seven bytes or less in length. A preferred implementation of the invention, as shown in FIG. 2, under these conditions include a Boundary Field (T) in the cache. For each byte in the cache line, there is a BF pair of bits. They are encoded as follows:

00=NOT A BOUNDARY
01=INSTRUCTION PREFIX BYTE
10=COMPLEX INSTRUCTION BOUNDARY (NO PREFIX)
11=SIMPLE INSTRUCTION BOUNDARY

When the cache line is first loaded in the cache (or when a store occurs to the cache line), the thirty-two 2-bit BFs are cleared. When an instruction is fetched from the line, the appropriate BF fields are written into the cache for that instruction. Only the instructions fetched will have BF information written back in the cache. Thus, for an instruction stream that first executes from a line in a cache, only one instruction is fetched at a time. However, the next time the instruction stream accesses the line, multiple instruction can be fetched in a cycle as long as their BF fields have been stored by previous execution. Complex instructions are not fetched in parallel with other instruction. They take two or more cycles to execute.

The invention is not limited to the four encodings described, other enhancements would be a code (bit) dedicated to the instruction boundary and subsequent codes (bits) describing command type, operand type, command location (if prefixed), branch history, exception history, and the like.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of fetching multiple instructions in a pipelined microprocessor for out-of-order instruction execution in microprocessor architectures that permit store to the instruction stream, said method comprising the steps of:

storing most recent addresses of cache lines which have been accessed for instruction fetching for execution in a content addressable memory, said instructions being of variable length;

logically identifying instruction boundaries for each of said plurality of instructions held in cache;

holding a next instruction in an anticipation buffer, said next instruction being located and identified by said identifying step using said content addressable memory;

aligning and appending said next instruction to said instructions held in cache, based on said step of logically identifying instruction boundaries, without first sequentially decoding said instructions;

detecting an occurrence of a store to memory request to one of said instruction addresses in the content addressable memory;

delaying the store to memory request until previous instructions are executed; and then refetching instructions that follow the store to memory request in program order.

2. The method as in claim 1, wherein said logically identifying step includes steps of identifying a characteristic of an accessed instruction of said instructions held in cache and storing information of said characteristic of said accessed instruction held in cache in a plurality of instruction boundary fields.

3. The method as in claim 1, further comprising a step, following said delaying step, of purging said instructions that follow the store to memory request that are being executed when said detecting step detects said occurrence of a store to memory request to addresses indicated by said instruction addresses in the memory.

4. The method as in claim 1, wherein said detecting step further comprises a step of comparing every active store to memory request with every instruction address in said memory during a machine cycle that had a store request.

5. A method as in claim 1, further comprising a step of executing at least two of said instructions held in cache simultaneously.

6. A method as in claim 1, wherein said logically identifying step further comprises:

modifying said cache to include an instruction boundary field; and determining a characteristic of said instruction and writing said characteristic in said instruction boundary field.

7. A method of fetching multiple instructions in a pipelined microprocessor for out-of-order instruction execution in microprocessor architectures that permit store to the instruction stream, said method comprising the steps of:

storing most recent addresses of cache lines which have been accessed for instruction fetching for execution in a content addressable memory, said instructions being of variable length;

logically identifying instruction boundaries for each of said plurality of instructions held in cache;

holding a next instruction in an anticipation buffer, said next instruction being located and identified by said identifying step using said content addressable memory;

detecting an occurrence of a store to memory request to one of said instruction addresses in the content addressable memory;

delaying the store to memory request until previous instructions are executed; and then refetching instructions that follow the store to memory request in program order, wherein said logically identifying step includes steps of identifying a characteristic of each of said instructions held in cache and storing information of said characteristic of each of said instructions held in cache in a plurality of instruction boundary fields, wherein said step of identifying a characteristic includes a step of identifying one of the following characteristics of each of said instructions held in cache:

00=NOT A BOUNDARY
01=INSTRUCTION PREFIX BYTE
10=COMPLEX INSTRUCTION BOUNDARY (NO PREFIX)
11=SIMPLE INSTRUCTION BOUNDARY.

8. The method as in claim 7, further comprising the steps of:

performing an instruction having said 11=SIMPLE INSTRUCTION BOUNDARY characteristic in one machine cycle, and performing an instruction having said 10=COMPLEX INSTRUCTION BOUNDARY (NO PREFIX) characteristic in at least two machine cycles.

9. A method of fetching multiple instructions in a pipelined microprocessor for out-of-order instruction execution in microprocessor architectures that permit store to the instruction stream, said method comprising the steps of:

storing most recent addresses of cache lines which have been accessed for instruction fetching for execution in a memory;

logically identifying instruction boundaries for each of said plurality of instructions held in cache;

holding a next instruction in an anticipation buffer, said next instruction being located and identified by said identifying step using said memory;

aligning and appending said next instruction to said instructions held in cache, based on said step of logically identifying instruction boundaries, without first sequentially decoding said instructions;

detecting an occurrence of a store to memory request to one of said instruction addresses in the memory;

delaying the store to memory request until previous instructions are executed; and then refetching instructions that follow the store to memory request in program order.

10. The method as in claim 9, wherein said storing step comprises a step of storing said most recent addresses in a content addressable memory.

11. The method as in claim 9, wherein said instructions are of variable length.

12. The method as in claim 9, wherein said logically identifying step includes steps of identifying a characteristic of an accessed instruction of said instructions held in cache and storing information of said characteristic of said accessed instruction held in cache in a plurality of instruction boundary fields.

13. A method as in claim 9, wherein said logically identifying step further comprises:

modifying said cache to include a boundary field; and determining a characteristic of said instruction and writing said characteristic in said boundary field.

14. The method as in claim 9, further comprising a step, following said delaying step, of purging said instructions that follow the store to memory request that are being executed when said detecting step detects said occurrence of a store to memory request to addresses indicated by said instruction addresses in the memory.

15. The method as in claim 9, wherein said detecting step further comprises a step of comparing every active store to memory request with every instruction address in said memory during a machine cycle that had a store request.

16. A method as in claim 9, further comprising a step of executing at least two of said instructions held in cache simultaneously.

17. A method of fetching multiple instructions in a pipelined microprocessor for out-of-order instruction execution in microprocessor architectures that permit store to the instruction stream, said method comprising the steps of:

storing most recent addresses of cache lines which have been accessed for instruction fetching for execution in a memory, detecting an occurrence of a store to memory request to one of said instruction addresses in the memory;

delaying the store to memory request until previous instructions are executed;

refetching instructions that follow the store to memory request in program order; and logically identifying instruction boundaries for each of said plurality of instructions held in cache, wherein said step of identifying a characteristic include a step of identifying one of the following characteristics of each of said instructions held in cache:

00=NOT A BOUNDARY

01=INSTRUCTION PREFIX BYTE

10=COMPLEX INSTRUCTION BOUNDARY (NO PREFIX)

11=SIMPLE INSTRUCTION BOUNDARY.

18. The method as in claim 17, further comprising the steps of:

performing an instruction having said 11=SIMPLE INSTRUCTION BOUNDARY characteristic in one machine cycle, and performing an instruction having said 10=COMPLEX INSTRUCTION BOUNDARY (NO PREFIX) characteristic in at least two machine cycles.

* * * * *